Figure 1:
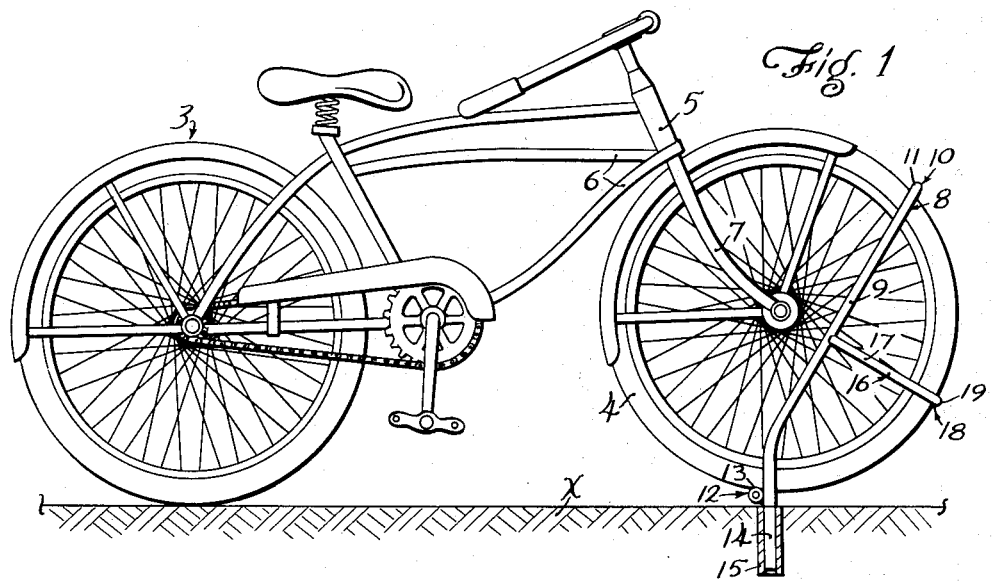

Oct. 4, 1955 — R. E. SILL — 2,719,632
STATIONARY BICYCLE STANDS
Filed March 22, 1952

INVENTOR.
Robert E. Sill
BY Harry D. Kilgore
Attorney

2,719,632
STATIONARY BICYCLE STANDS

Robert E. Sill, Rochester, Minn.

Application March 22, 1952, Serial No. 277,985

1 Claim. (Cl. 211—22)

My invention relates to improvements in bicycle stands of the stationary type.

An object of this invention is to provide an extremely simple and highly efficient bicycle stand which may be either anchored in a stationary position or removably held in a stationary position.

A further object is to provide a bicycle stand for holding the front wheel of a bicycle from tipping sidewise or turning about the axis of the head of the front fork of the bicycle.

A still further object is to provide a bicycle stand having front and rear stops for the front wheel of a bicycle.

Other objects of the invention will be apparent from the following description, reference being had to the drawing.

To the above end, generally stated, the invention consists of the novel devices and combination of devices hereinafter described and defined in the claim.

In the accompanying drawing, which illustrates the invention, like characters indicate like parts throughout the several views.

Figure 2:
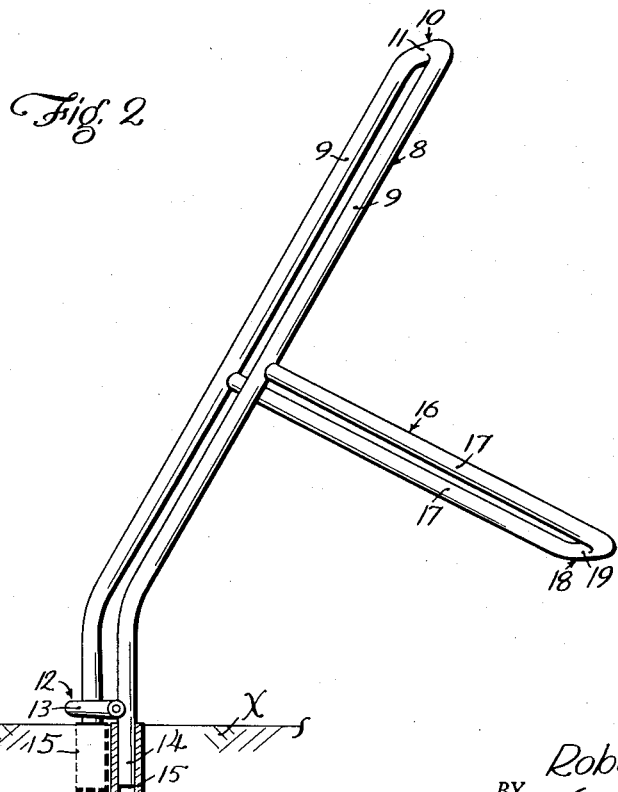

Referring to the drawing:

Fig. 1 is a side elevational view of the novel bicycle stand holding a bicycle; and Fig. 2 is a perspective view of the bicycle stand, on an enlarged scale, and looking at the same on the same side from that shown in Fig. 1.

The bicycle shown in Fig. 1 is indicated as an entirety by the numeral 3, and of the parts thereof it is important to note the front wheel 4 and the head 5 on the frame 6 in which the front fork 7 is turnably mounted.

My bicycle stand includes a yoke-like frame 8 formed, as shown, of a single round rod. This frame 8 is forwardly and upwardly inclined and the side members 9 thereof are long, parallel and laterally spaced horizontally. The transverse member 10 of the U-frame 8 is uppermost and affords an upper or front stop 11 for the front wheel 4.

The frame side members 9 at their rear or lower end portions are rigidly connected, as shown, by a short piece of pipe 12 that affords a lower or rear stop 13 for the front wheel 4 and on which stop said wheel rests. The lower or rear end portions of the side members 9, outwardly of the rear stop 13 extend vertically downwardly and afford anchoring prongs 14. As shown, the prongs 14 are removably held in sockets 15 in the form of pieces of pipe sunk in the ground x. The word "ground" is herein used in a broad sense to cover solid earth, pavement, a floor or the like. It will be noted that the rear stop 13 is close to the ground x and the front stop 11 is, as shown, above the axis of the front wheel 4.

The improved bicycle stand further includes a U-shaped frame extension 16 that extends downwardly and forwardly under the frame 8. The side members 17 of the frame extension 16 are in the same planes as the frame side members 9. The transverse member 18 of the frame extension 16 is lowermost and affords a support 19 on which the wheel 4 rests. The ends of the frame extension side members 17 are rigidly secured to the frame side members 9 on the under sides thereof. As shown, the front stop 11, the rear stop 13 and the support 19 are approximately the same distance from the axis of the wheel 4.

Obviously, the two stops 11 and 13 prevent the wheel 4 from rolling either forwardly or backwardly and the frame extension 16 holds said wheel from tipping sidewise or from turning about the axis of the head 5.

It will be understood that the bicycle stand described herein is capable of multiple arrangement to accommodate any number of bicycles in a row and also that it is possible to rearrange the various component parts of the stand in such a manner that the prongs 14 are capable of being embedded or anchored in a vertical support such as a wall or the like.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claim as are stated herein, or required by the prior art.

What I claim is:

A bicycle stand including a long upright yoke-like frame, the lower end portions of its side members being vertical and affording a pair of short anchoring prongs, the long upper portion of the frame being outwardly inclined, a cross-tie member intermediately connecting the prongs and affording a stop, a yoke like frame extension having its side members, at their outer ends, fixed, one to each of the side members of the frame midway between the prongs and the upper end of the frame, said frame extension being substantially perpendicular to the frame and projecting outwardly thereof and cross-connecting the side members of the frame, the bicycle stand being constructed and arranged to support one of the wheels of a bicycle on the cross-tie member slightly inwardly of a vertical plane passing through the axis of the wheel, and with the frame and the frame extension straddling the wheel and with the wheel engaging the transverse members thereof, the former near its top and outwardly of said vertical plane, and the latter, substantially midway between a horizontal plane passing through the axis of the wheel and the bottom of the wheel.

References Cited in the file of this patent

UNITED STATES PATENTS

| D. 32,181 | Pease | Jan. 30, 1900 |
| 431,760 | Curtis | July 8, 1890 |

FOREIGN PATENTS

| 12,144 | Great Britain | Apr. 29, 1899 |
| 17,656 | Great Britain | July 14, 1904 |
| 27,928 | Denmark | June 23, 1921 |
| 456,677 | Great Britain | Nov. 13, 1936 |
| 41,365 | Holland | Aug. 16, 1937 |
| 867,487 | France | Aug. 4, 1941 |
| 60,086 | Sweden | Oct. 31, 1924 |